July 11, 1967

C. S. MERCER ET AL 3,330,567

INTERNALLY REINFORCED NECK SEAL

Filed April 21, 1966

INVENTORS
Charles S. Mercer
BY Charles A. Rich Jr.
Russell, Chittick & Pfund
Attorneys July 11, 1967    C. S. MERCER ET AL    3,330,567
INTERNALLY REINFORCED NECK SEAL
Filed April 21, 1966    4 Sheets-Sheet 4

INVENTORS
Charles S. Mercer
BY Charles A. Rich Jr.

ATTORNEYS

United States Patent Office 3,330,567
Patented July 11, 1967

---

3,330,567
INTERNALLY REINFORCED NECK SEAL
Charles S. Mercer, Northborough, and Charles A. Rich, Jr., Southboro, Mass., assignors to Morgan Construction Company, Worcester, Mass., a corporation of Massachusetts
Filed Apr. 21, 1966, Ser. No. 549,757
5 Claims. (Cl. 277—164)

This application is a continuation-in-part of copending application Ser. No. 282,263, filed May 22, 1963, now abandoned.

This invention relates to oil seals and more particularly to an improved construction for internally reinforced neck seals of the type used in wet or dry rolling mills.

Neck seals of the type herein described are utilized in wet rolling mills for the dual purpose of first preventing the loss of oil from the roll neck bearings, and secondly for preventing penetration into the roll neck bearings of foreign matter such as cooling water and mill scale. In dry mills, the neck seals prevent the escape of lubricating oil from the bearings and also prevent penetration of grit and dust. The seals are usually annular in shape, molded of a resilient impervious material such as for example synthetic rubber, and are tightly fitted in circumferential engagement about the roll necks for rotation therewith at some intermediate point between the roll body and the roll neck bearings. Although the cross sectional configurations of the seals are subject to many design variations, they often incorporate integrally molded radially extending circumferential flanges commonly referred to as "flingers." The flingers cooperate with stationary components in the seal assembly to provide the aforementioned oil and water-tight integrity.

Where the rolls are revolving at relatively high speeds, as is particularly true of rolls contained in the finishing stands, the seals are subjected to considerable concentrations of centrifugal force. Since the seal bodies are molded of rubber or some other resilient material, they have a tendency to yield and become distorted by centrifugal force. This results in some application in the radial displacement of the seal bodies away from the surfaces of the roll necks and the formation of an annular space between the seal body and the roll neck with an accompanying loss of sealing capacity therebetween.

In an effort to overcome the aforementioned adverse effects of centrifugal force, seal bodies have in the past been externally reinforced by separate circular metal retaining bands. Although this modification has succeeded to some extent in preventing the seals from radially parting from the roll necks during high speed rotation, the ease of initial seal installation and subsequent maintenance has been unduly complicated by the addition of the separate retaining bands. More particularly, the separate retaining bands do not prevent inward "sagging" of the seal bodies prior to their being mounted on the roll necks. This in turn sometimes results in the band and/or the resilient seal bodies being accidentally engaged by the roll end during mounting of the bearing on the roll neck. When this occurs, the band may be wedged between the stationary components of the seal assembly and the roll neck, resulting in permanent band distortion requiring its immediate replacement.

In addition, since the seals must of necessity be temporarily bent and distorted during installation, the sharp metal edges of the separate retaining bands frequently cut and chafe the outer surfaces of the relatively soft seal material, resulting in a weakening of the seal body which often remains undetected until the seal fails prematurely.

It has now been discovered that the aforementioned separate retaining bands can be eliminated without sacrificing seal strength by providing an internal means of reinforcing the neck seals, said means taking the form of a reinforcing cable embedded within the seal body and fabricated of steel or some other material having high tensile strength. Furthermore, improved means have been provided for accurately positioning the reinforcing cable within the seal body at the exact point of centrifugal force concentration.

It is therefore an object of the present invention to provide an improved integrally fabricated reinforced neck seal capable of being quickly and easily installed without danger of damaging the seal body or accidentally dislodging the reinforcing components.

Another object of the present invention is to provide a neck seal embodying an internally embedded reinforcing means for resisting centrifugal force tending to push the seal body away from the roll neck.

Another object of the present invention is to avoid the necessity of utilizing separate reinforcing bands in order to maintain the neck seal in contact with the roll neck during high speed rotation thereof.

A further object of the present invention is to provide a simple and accurate means of locating one or more reinforcing cables within the seal body at the points of maximum centrifugal force concentration.

These and other objects of the present invention will become more apparent as the description proceeds with the aid of the accompanying drawings in which.

Figure 1:
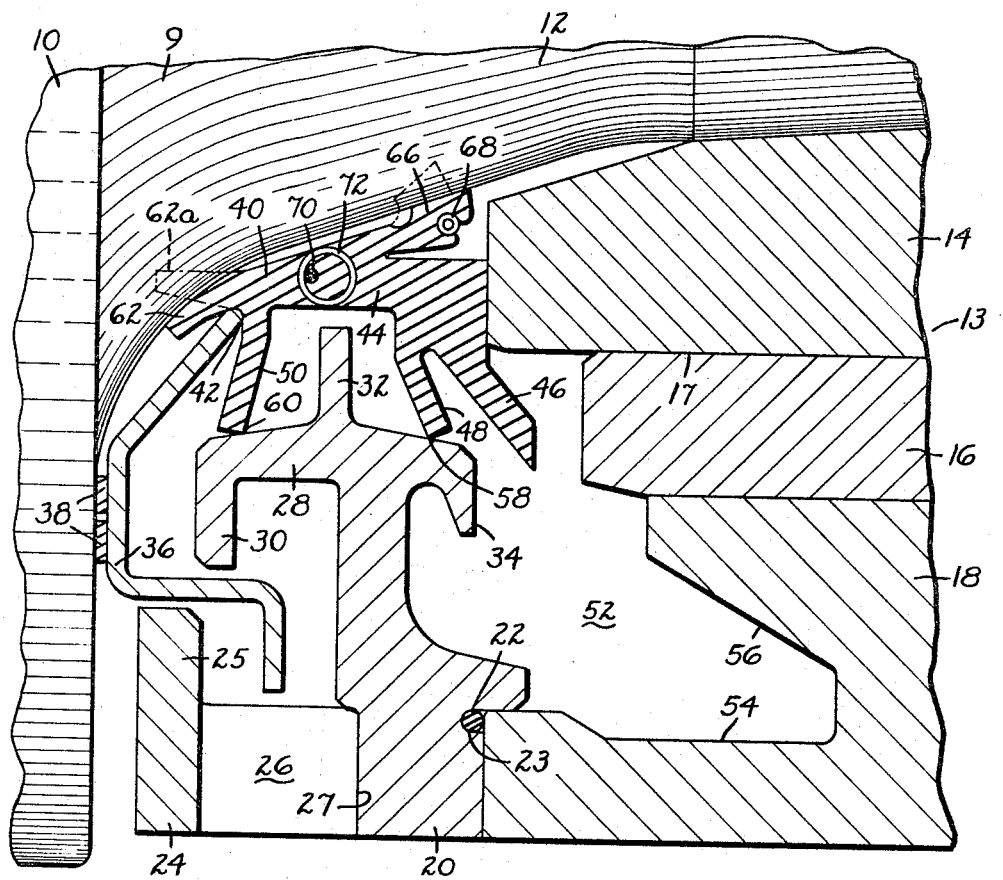
FIG. 1 is a view in section of an internally reinforced neck seal mounted in a conventional seal assembly on the tapered conical portion of a roll neck in a wet rolling mill.

Referring now to FIG. 1 a roll generally indicated at 9 and comprised of a roll body 10 with tapered roll neck 12 is shown rotatably supported within a roll neck bearing 13 of the oil-film type. Bearing 13 consists of a roll sleeve 14 mounted on the roll neck 12 for rotation therewith and in turn rotatably supported within the nonrotating bushing 16 of roll chock 18. During operation of the mill, sleeve 14 rotates within bushing 16 with a thin film of oil constantly provided therebetween along line 17 in order to reduce mechanical friction and prevent excessive wear. It can therefore be seen that without provisions being made for further sealing and retaining means, the oil would be lost as it flowed outwardly from between the sleeve 14 and bushing 16. In addition, cooling water applied to the rolls during a wet rolling operation and mill scale would be permitted to penetrate between the rotating sleeve and the bushing, resulting in contamination of lubricating oil and corresponding excessive mechanical friction and bearing wear.

In order to avoid the aforementioned difficulties a seal assembly of the type illustrated in FIG. 1 is positioned between the roll body 10 and the bearing assembly 13. A seal end plate 20 is first mounted against chock 18, a circular seal ring 22 being positioned in compression therebetween in annular groove 23 in order to insure an oil and water-tight joint. An outer seal ring 24 having an inwardly disposed radial flange 25 and a downwardly disposed coolant drain 26 is next provided in abutting relationship with seal end plate 20 within annular groove 27. During mill operation, drain 26 provides a large drainage area for cooling water and mill scale, thereby preventing accumulation of scale deposits and clogging.

Although not shown in FIG. 1, aligned holes are provided in both the seal end plate 20 and the outer seal ring 24 together with similarly disposed threaded apertures in the chock 18. When the end plate and outer seal ring are properly aligned with respect to the chock, bolts are passed therethrough and threaded within the threaded apertures in the chock, in order to provide a means of securely interconnecting each of the said components in non-rotative alignment.

The inwardly disposed portion of seal end plate 20 is further provided with an integrally fabricated cross member 28 having flanges 30, 32 and 34 extending radially therefrom. An annular inner seal ring 36 of irregular cross section is provided with fiber spacers 38 in contact with the roll body 10 in order to avoid metal to metal contact therewith. Seal ring 36 rotates with roll 10 with its lower portion extending between the spaced radial flanges 25 and 30 of the outer seal ring 24 and seal end plate 20. The inner end of seal ring 36 is held in contact with a rotating neck seal 40 as at 42 by the pressure exerted thereon by roll body 10 through spacers 38. Thus it can be seen that roll rotation is accompanied by rotation of the neck seal 40 and the inner seal ring 36. When the roll neck is removed from the neck bearing, inner seal ring 36 is allowed to move freely in relation to the remaining seal components, thereby providing greater access to the neck seal 40.

The neck seal 40 which embodies the concepts of the present invention, is annularly constructed and retains the same form and cross section around the entire circumference of the roll neck. The main body 44 of neck seal 40 is provided with integrally molded radial flanges or "flingers" 46, 48 and 50 extending outwardly therefrom.

As oil escapes from between sleeve 14 and bushing 16 along line 17, it will be deposited first on rotating flinger 46 and directed by centrifugal force to the annular oil receiving passageway 52 formed by the inwardly disposed flanges 54 and 56 of chock 18. Should any oil escape around the end of flinger 46, it will be further deflected by flinger 48 in constant frictional contact as at 58 with the upper surface of integrally fabricated cross member 28. In addition, water and scale that might possibly escape through the labyrinth created by flanges 25 and 30 and rotating inner seal rings 36 will further be deflected by flinger 50 also in contact with integrally fabricated cross member 28 as at 60. Thus it can be seen that through the cooperation of the rotating neck seal 40 having radial flanges or flingers 46, 48 and 50, the rotating inner seal plate 36 and the non-rotating seal end plate 20 with its radially disposed flanges, 30, 32 and 34, both oil and water are prevented from passing between the neck seal 40 and the seal end plate 20.

There remains however the possibility that water and scale might pass between the roll body and the inner seal ring in the area of spacers 38. To prevent its further infiltration into the neck bearing, a molded flange 62 is additionally provided on the seal body 44. Although normally extending as shown by dotted lines as at 62a, flange 62 is pressed by the tapered portion of roll neck 12 and the inner end of seal plate 36 into a curved outwardly directed configuration as shown in FIG. 1. A similar flange 66 is provided at the other end of the seal body and is held against the neck surface by garter spring 68.

Although the above-mentioned arrangement has been found satisfactory in holding the seal body against the roll neck when the roll is at rest or rotating at slow speeds, experience has shown that as the roll is rotated at faster speeds, the resilient seal body has a tendency to pull away under centrifugal force from the neck surface.

Although oil and water-tight integrity will continue to be maintained in wet mill applications due to the pressure exerted on the seal body at the inboard and outboard ends by garter spring 68 and inner seal ring 36 at 42, the deformation occurring at the central portion of the seal body will cause an increase in pressure and friction between the ends of flingers 48 and 50 and cross member 28 as at 58 and 60. This in turn will result in excessive seal wear at these points and a corresponding shortening of the seal's useful life.

Figure 4:
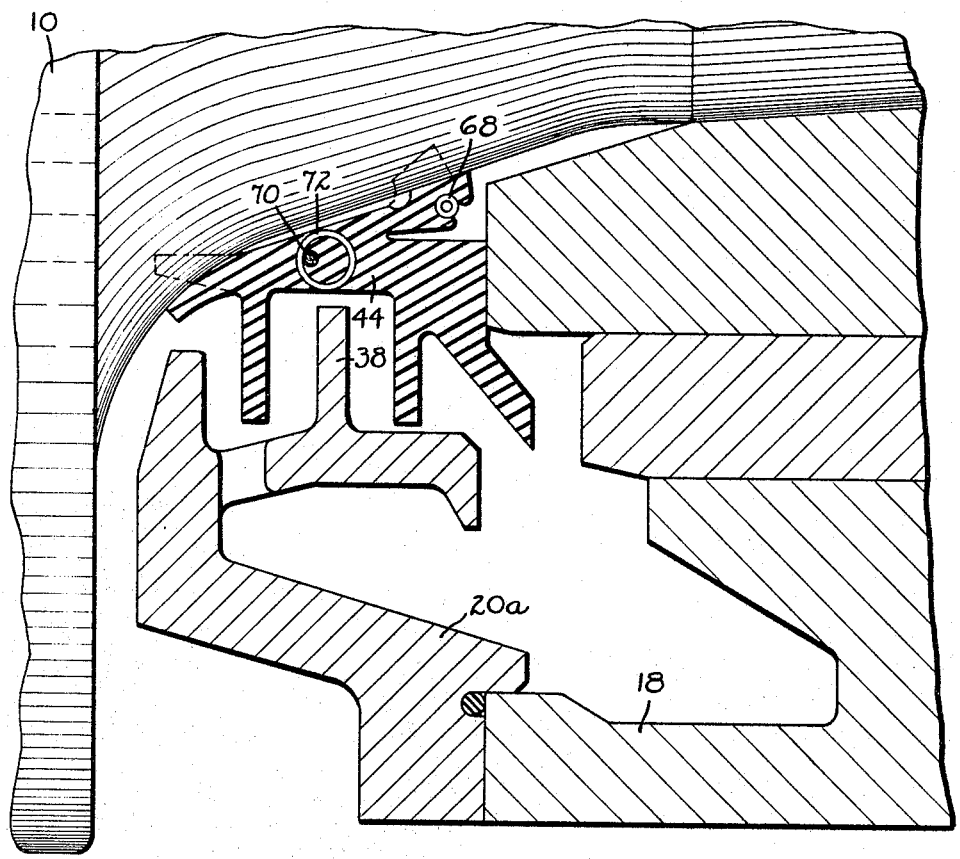
FIG. 4 is a view similar to FIG. 1 showing an internally reinforced neck seal mounted on a roll neck in a dry rolling mill; and, FIG. 5 is a view of still another seal construction having a plurality of reinforcing cables embedded therein.

A further disadvantage resulting from seal distortion in the dry mill application is made evident by reference to FIG. 4. As can be seen in this figure, a seal end plate 20a of slightly different shape is provided in abutting relationship with chock 18 without the use of an inner seal ring 36 as shown in FIG. 1. Consequently, without additional reinforcing means, retaining pressure is exerted on the seal body at only one point by garter spring 68. Thus it can be seen that seal distortion under centrifugal force will be more pronounced in the dry mill application, with the result in some cases that the tension in the garter spring 68 may be overcome. When this occurs, the entire seal body 44 may pull away from the roll 12, resulting not only in excessive seal wear but also in a loss of lubricating oil and contamination of the bearing by grit and scale.

As previously mentioned, separate reinforcing bands have been utilized in the past in an attempt at preventing the aforementioned seal distortion. Although this modification was moderately successful in this respect, it created other problems which in the final analysis overcame any advantage gained. For example, it can be seen from FIGS. 1 and 4 that the neck seal body 44 must of necessity be temporarily bent and distorted in order to be placed in a position straddling the rigid inwardly disposed flange 32 of seal end plate 20. The addition of a separate reinforcing band renders this procedure considerably more difficult. Furthermore, the bending of the combined neck seal body and separate reinforcing band during installation will as previously mentioned sometimes result in cutting and chaffing of the outer seal surface.

The present invention avoids these difficulties by embedding the reinforcing means within the neck seal body. More particularly, as can be seen in FIG. 1, the reinforcing means consists of a cable 70 having high tensile strength surrounded by a helical spring 72, both cable and spring being embedded within the rubber neck seal body 44 to form a single integral unit. The advantages of this consruction will now be pointed out. Of primary importance with this unitized construction is the ease with which the neck seal may now be bent and distorted during installation without fear of chaffing or cutting its outer surface and without the possibility of inadvertently disengaging the reinforcing means from the seal body. In addition, the embedded reinforcing means lends additional rigidity to the seal body and prevents its "sagging" prior to the mounting of the bearing and seal assembly on the roll neck. In this manner, accidental engagement of the seal by the roll end and permanent distortion as a result of the seal being wedged between the stationary seal assembly components and the roll neck are avoided.

A still further advantage of the internal reinforcing arrangement herein disclosed is found in the ease with which the improved neck seal may be fabricated. More specifically, it should be carefully noted that the proper positioning of the reinforcing cable within the seal body is of particular importance if centrifugal force acting on the seal during subsequent high speed rotation is to be properly opposed. Thus it becomes necessary to provide a means of controlling the position of the cable during the molding operation. This is accomplished through the use of a helical spring 72. In order to clearly illustrate this point, the steps of fabricating a neck seal embodying the present invention will now be described with reference to FIG. 2 and 3.

Figure 3:
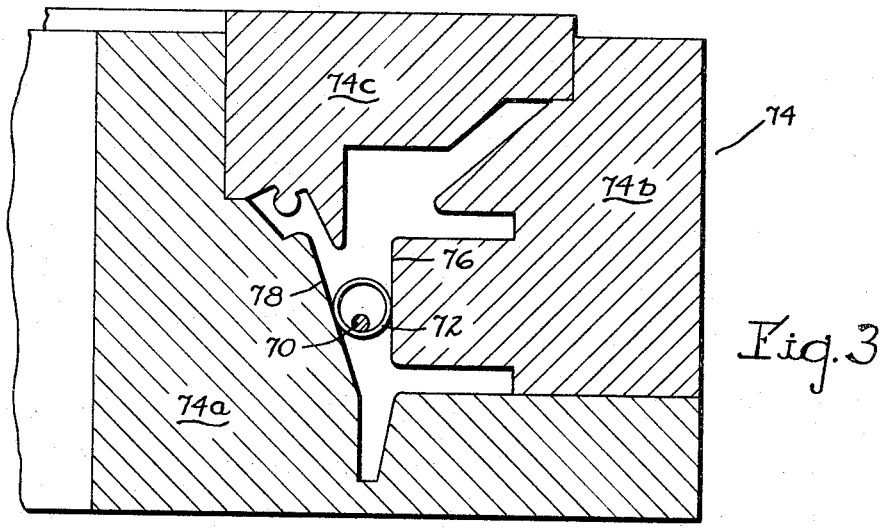
FIG. 3 is a sectional view of the cable and spring positioned in the mold prior to filling the mold with the seal material.
Figure 2:
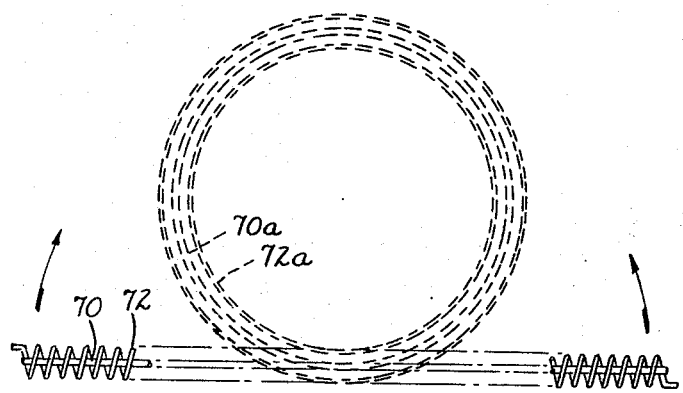
FIG. 2 is a somewhat schematic plan view of the reinforcing cable and helical spring prior to and after assembly.

As can be seen in FIG. 2, a longitudinal cable 70 is first axially inserted within a helical spring 72 of substantially equal length. The inner diameter of spring 72 is considerably greater than the outer diameter of cable 70 in order to provide a relatively loose fit therebetween. The ends of both the cable 70 and the spring 72 are then brought together and joined to form a circular combination as illustrated at 70a and 72a. The combination of the cable 70 now forming a hoop and its surrounding spring 72 are then placed in the neck seal mold 74 as shown in FIG. 3. As can be seen in this figure, the neck seal mold is comprised of a base section 74a, a side section 74b and a top section 74c. Top section 74c is removed in order to deposit the spring and cable combination therein. When so deposited, the spring descends downwardly into the mold until it reaches a point where the lateral distance between the converging sides 76 and 78 of the mold cavity are equal to its outer diameter. Cable 70 descends slightly further until engaged by the inner surfaces of the spring's spaced helical convolutions. Thus it can be seen that the position of the cable within the mold cavity is governed entirely by the outer diameter of helical spring 72. By increasing or decreasing the outer diameter of spring 72, the cable can be raised or lowered within the mold cavity. By utilizing a spring of constant outer diameter, the cable will be positioned at exactly the same position within each seal fabricated. In addition, the embedded spring will contribute markedly to the above-mentioned added rigidity of the neck seal prior to the mounting of the bearing on the roll neck. The seal material in plastic state is then deposited in the mold and the top section 74c inserted and pressed downwardly in order to squeeze the seal material into all mold cavities. Because spring 72 is comprised of a series of spaced concentric convolutions, the plastic material easily passes therethrough in order to completely surround the cable. After the material has been cured and solidified, the internally reinforced seal is removed from the mold as a single unit by simply disassembling the three mold sections.

Since the embedded cable is comprised of a material having a relatively high tensile strength, such as for example steel, the ability of the neck seal to withstand deformation under centrifugal force is greatly increased with the result that the seal can now maintain its position on the roll neck during high speed mill operations. Furthermore, the single unit construction greatly simplifies installation and in addition, prevents the aforementioned surface chaffing and cutting which accompanied the installation of externally reinforced neck seals.

Figure 5:
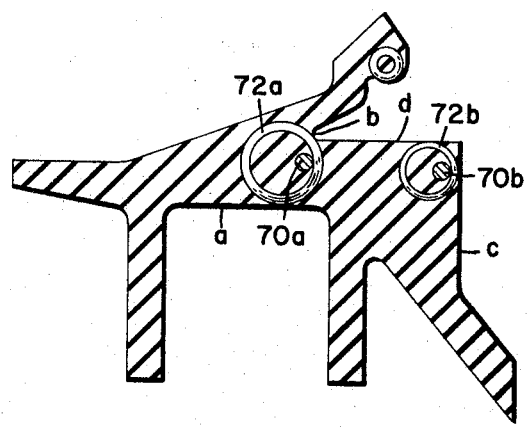

FIG. 5 shows still another seal construction similar to those shown in FIGS. 1 and 4, but with two cable and spring reinforcing combinations embedded therein. More particularly, in this arrangement, one reinforcing combination which includes cable 70a and spring 72a is embedded in the seal body at a position determined by the tangential relationship of the spring to the non-parallel seal surfaces "a" and "b." Another reinforcing combination including cable 70b and spring 72b is similarly located at a different position with the spring 72b being tangentially disposed to non-parallel seal surfaces "c" and "d."

This type of seal construction illustrates the fact that any number of reinforcing spring and cable combinations can be accurately located in an embedded position within the seal body, as long as non-parallel seal surfaces are present to cooperate with each coiled spring in carrying out the latter's locating function. Thus, where centrifugal forces are concentrated at more than one point, a plurality of counteracting reinforcing cables can be utilized.

It is our intention to cover all changes and modifications of the invention chosen for purposes of disclosure which do not constitute departures from the spirit and scope of the invention.

We claim:

1. A roll neck seal for use in a rolling mill comprising the combination of: an annularly shaped seal body molded of a resilient impervious material, said seal body having at least two non-parallel outer surfaces; reinforcing means for preventing radial distortion of said seal body under centrifugal force developed during operation of the mill, said means comprising at least one high strength reinforcing cable embedded within said seal body at the approximate point of concentration of said centrifugal force; and means for locating said cable within said seal body, said means including a coiled spring surrounding said cable with its inner surface in continuous contact therewith, the outer surface of said spring being tangentially disposed to both said non-parallel outer surfaces, said impervious material permeating said coiled spring to surround said cable, thereby providing an integrally fabricated seal construction.

2. In a neck seal of the type used in a rolling mill, said seal having at least two non-parallel outer surfaces, means for locating a reinforcing cable of high tensile strength within said seal at an approximate point of maximum stress concentration, said means comprising a helical spring having spaced concentric convolutions, each said convolutions having an inner cross-sectional diameter substantially greater than the outer cross-sectional diameter of said cable, said cable position within said spring in contact with the inner cross-sectional diameter of each said spring convolutions, the outer cross-sectional diameter of said spring being in tangential relationship with said non-parallel outer surfaces, the resilient material of said neck seal completely filling the spaces between the convolutions of said spring and the space between the inner surfaces of said spring and the outer surface of said cable to form an integrally fabricated unitized assembly.

3. In a rolling mill, an integrally fabricated internally reinforced seal mounted on the tapered portion of a roll neck comprising the combination of: an annular neck seal body molded of resilient impervious material, said seal body having an inner diameter equal to the outer diameter of said tapered roll neck portion at a position along its longitudinal axis corresponding to the position at which said neck seal is to be mounted; annular reinforcing means for preventing distortion and radial displacement of said seal body away from the outer surface of said roll neck as centrifugal force is developed during high-speed rotation thereof, said reinforcing means embedded within said seal body in coextensive relationship therewith at the approximate point of maximum concentration of said centrifugal force; and locating and strengthening means contained within said seal body in continuous contact with said reinforcing means for positioning said reinforcing means in relation to the outer surfaces of said seal body during the fabrication thereof said resilient impervious material permeating said locating and strengthening means and surrounding said reinforcing means to provide an integrally fabricated seal construction.

4. The combination as set forth in claim 3 wherein said internal reinforcing means is comprised of a high tensile strength cable, the ends of said cable being connected in order to form a circular hoop.

5. The combination as set forth in claim 4 wherein said locating and strengthening means is comprised of a coiled spring, the inner cross-sectional diameter of said spring being substantially greater than the outer cross-sectional diameter of said cable, said spring being embedded within said seal body with its inner cross-sectional diameter in continuous contact with said cable, the outer cross-sectional diameter of said spring being tangentially related to at least two outer non-pallel surfaces of said neck seal body in order to provide a means of locating said cable within said seal during the molding thereof.

(References on following page)

References Cited

UNITED STATES PATENTS

| | | | |
|---|---|---|---|
| 1,984,806 | 12/1934 | Pfefferle | 277—71 |
| 2,294,589 | 9/1942 | Waterbury | 264—275 |
| 2,325,556 | 7/1943 | Taylor et al. | 277—235 X |
| 2,731,284 | 1/1956 | Chambers et al. | 277—179 |
| 2,743,950 | 5/1956 | Helfrecht et al. | 277—179 |
| 2,868,574 | 1/1959 | Rich | 277—164 |
| 2,948,527 | 8/1960 | Gilbert | 277—95 |
| 2,995,782 | 8/1961 | Heller | 264—275 |
| 3,093,425 | 6/1963 | Rich | 308—36.1 |

FOREIGN PATENTS

| | | |
|---|---|---|
| 209,652 | 6/1960 | Austria. |
| 650,078 | 10/1902 | Canada. |

LAVERNE D. GEIGER, *Primary Examiner.*

J. S. MEDNICK, *Assistant Examiner.*